(12) United States Patent
Tanaka

(10) Patent No.: US 12,416,700 B2
(45) Date of Patent: Sep. 16, 2025

(54) ESTIMATION METHOD AND ESTIMATION DEVICE

(71) Applicant: Socionext Inc., Kanagawa (JP)

(72) Inventor: Koichiro Tanaka, Yokohama (JP)

(73) Assignee: Socionext Inc., Kanagawa (JP)

( * ) Notice: Subject to any disclaimer, the term of this patent is extended or adjusted under 35 U.S.C. 154(b) by 321 days.

(21) Appl. No.: 18/101,803

(22) Filed: Jan. 26, 2023

(65) Prior Publication Data

US 2023/0168329 A1 Jun. 1, 2023

Related U.S. Application Data

(63) Continuation of application No. PCT/JP2021/028952, filed on Aug. 4, 2021.
(Continued)

(51) Int. Cl.
*G01S 3/46* (2006.01)
*G01S 7/02* (2006.01)
*H04B 7/06* (2006.01)

(52) U.S. Cl.
CPC ............. *G01S 3/46* (2013.01); *G01S 7/02* (2013.01); *H04B 7/06* (2013.01)

(58) Field of Classification Search
CPC ... G01S 3/46; G01S 7/02; G01S 7/354; G01S 7/4026; G01S 13/4454; G01S 13/003; H04B 7/06
See application file for complete search history.

(56) References Cited

U.S. PATENT DOCUMENTS 3,824,595 A 7/1974 Hall
5,541,608 A 7/1996 Murphy et al.
(Continued)

FOREIGN PATENT DOCUMENTS

JP 2010-286402 A 12/2010
JP 2013-195189 A 9/2013
(Continued)

OTHER PUBLICATIONS

Written Opinion of the International Search Authority issued on Nov. 2, 2021 in International (PCT) Application No. PCT/JP2021/028952, with English translation.
(Continued)

*Primary Examiner* — Kabir A Timory
(74) *Attorney, Agent, or Firm* — Rimon P.C.

(57) ABSTRACT

An estimation method includes: receiving, by first and second antennas, radio waves including reflected radio waves that are radio waves transmitted from a transmitting antenna and reflected by a target; calculating a phase difference between first received radio waves that are radio waves received by the first antenna in the receiving and second received radio waves that are radio waves received by the second antenna in the receiving; calculating an amount of correction based on the amplitude of the first received radio waves and the amplitude of the second received radio waves, adding the calculated amount of correction to the phase difference calculated in the calculating of the phase difference, and obtaining a corrected phase difference resulting from correction of the phase difference; and estimating, based on the corrected phase difference and the distance between the first and second antennas, a direction in which the target is located.

12 Claims, 8 Drawing Sheets

Related U.S. Application Data

(60) Provisional application No. 63/065,216, filed on Aug. 13, 2020.

(56) References Cited

U.S. PATENT DOCUMENTS

| | | | |
|---|---|---|---|
| 5,821,816 A * | 10/1998 | Patterson | H03L 7/183 |
| | | | 327/107 |
| 10,197,681 B2 * | 2/2019 | Nakamura | G01C 21/165 |
| 2010/0134344 A1 | 6/2010 | Uesato | |
| 2020/0057130 A1 * | 2/2020 | Simileysky | H04W 4/023 |

FOREIGN PATENT DOCUMENTS

| | | |
|---|---|---|
| WO | 2009/019881 A1 | 2/2009 |
| WO | 2013/118557 A1 | 8/2013 |

OTHER PUBLICATIONS

International Search Report (ISR) issued on Nov. 2, 2021 in International (PCT) Application No. PCT/JP2021/028952, with English translation.

* cited by examiner

ESTIMATION METHOD AND ESTIMATION DEVICE

CROSS REFERENCE TO RELATED APPLICATIONS

This is a continuation application of PCT International Application No. PCT/JP2021/028952 filed on Aug. 4, 2021, designating the United States of America, which is based on and claims priority of U.S. Provisional Patent Application No. 63/065,216 filed on Aug. 13, 2020. The entire disclosures of the above-identified applications, including the specifications, drawings and claims are incorporated herein by reference in their entirety.

FIELD

The present disclosure relates to estimation methods and estimation devices.

BACKGROUND

Patent Literature (PTL) 1 discloses a technique in which the arrival angle of received radio waves can be estimated from a phase difference between the received radio waves.

CITATION LIST

Patent Literature

PTL 1: Japanese Unexamined Patent Application Publication No. 2010-286402

SUMMARY

Technical Problem

However, with the technique disclosed in PTL 1, when there is a disturbance in received radio waves including reflected radio waves that are radio waves reflected by a target such as inclusion of reflected radio waves that are radio waves reflected by a reflective object different from the target, the arrival angle of the received radio waves cannot be accurately estimated. Furthermore, in such a case, it is not possible to accurately estimate a direction in which the target is located.

The present disclosure is conceived in view of the above-described circumstances and has an object to provide an estimation method and an estimation device in which even when there is a disturbance in received radio waves, a direction in which a target is located can be estimated.

Solution to Problem

In order to achieve the aforementioned object, an estimation method according to one aspect of the present disclosure includes: receiving, by a first antenna and a second antenna different from the first antenna, radio waves including reflected radio waves that are radio waves transmitted from a transmitting antenna and reflected by a target; calculating a phase difference between first received radio waves that are radio waves received by the first antenna in the receiving and second received radio waves that are radio waves received by the second antenna in the receiving; calculating an amount of correction based on an amplitude of the first received radio waves and an amplitude of the second received radio waves, adding, to the phase difference calculated in the calculating of the phase difference, the amount of correction calculated, and obtaining a corrected phase difference resulting from correction of the phase difference; and estimating, based on the corrected phase difference and a distance between the first antenna and the second antenna, a direction in which the target is located.

In this manner, the phase difference between the received radio waves is corrected by the amount of correction based on the amplitude of the received radio waves, and thus disturbances in the phase difference between the received radio waves can be reduced. Thus, even when there is a disturbance in the received radio waves, the arrival angle of the received radio waves can be estimated from the corrected phase difference, and therefore a direction in which the target is located can be estimated.

Here, for example, in the calculating of the amount of correction, the amount of correction may be calculated using a coefficient and a value of a ratio between the amplitude of the first received radio waves and the amplitude of the second received radio waves.

In this manner, the phase difference between the received radio waves is corrected by the amount of correction based on the value of the ratio between the amplitudes of the received radio waves, and thus disturbances in the phase difference between the received radio waves can be reduced.

Here, for example, an absolute value of the amount of correction may decrease as the value of the ratio approaches predetermined value k, and the predetermined value k may be determined from one of a result of an experiment or a result of a simulation.

Here, for example, in the calculating of the amount of correction, the amount of correction may be calculated using two or more coefficients and two or more terms having a highest order of at least 2 and including the ratio.

In this manner, the phase difference between the received radio waves is corrected by the amount of correction calculated according to a high-order expression using the ratio between the amplitudes of the received radio waves, and thus disturbances in the phase difference between the received radio waves can be further reduced.

Furthermore, for example, in the calculating of the amount of correction, the amount of correction may be calculated using a coefficient and a value of a difference between the amplitude of the first received radio waves and the amplitude of the second received radio waves, and an absolute value of the amount of correction may be reduced as an absolute value of the difference is reduced.

In this manner, the phase difference between the received radio waves is corrected by the amount of correction based on the difference between the amplitudes of the received radio waves, and thus disturbances in the phase difference between the received radio waves can be reduced.

Furthermore, for example, in the calculating of the amount of correction, the amount of correction may be calculated using two or more coefficients and two or more terms having a highest order of at least 2 and including the difference.

In this manner, the phase difference between the received radio waves is corrected by the amount of correction calculated according to a high-order expression using the difference between the amplitudes of the received radio waves, and thus disturbances in the phase difference between the received radio waves can be further reduced.

Furthermore, for example, in the calculating of the amount of correction, the amount of correction may be calculated using a coefficient and a value of a ratio between a sum of the amplitude of the first received radio waves and the amplitude of the second received radio waves and a difference between the amplitude of the first received radio waves and the amplitude of the second received radio waves.

In this manner, the phase difference between the received radio waves is corrected by the amount of correction based on the value of the ratio between the sum of the amplitudes of the received radio waves and the difference between the amplitudes of the received radio waves, and thus disturbances in the phase difference between the received radio waves can be reduced.

Here, for example, an absolute value of the amount of correction may decrease as the ratio of the difference to the sum approaches predetermined value m.

Furthermore, for example, in the calculating of the amount of correction, the amount of correction may be calculated using two or more coefficients and two or more terms having a highest order of at least 2 and including the ratio between the sum and the difference.

In this manner, the phase difference between the received radio waves is corrected by the amount of correction calculated according to a high-order expression using the value of the ratio between the sum of the amplitudes of the received radio waves and the difference between the amplitudes of the received radio waves, and thus disturbances in the phase difference between the received radio waves can be further reduced.

Furthermore, for example, in the calculating of the phase difference, when the phase difference calculated in the calculating of the phase difference is within a predetermined range including a range where a relationship between the phase difference and an arrival angle is no longer monotonic, the corrected phase difference resulting from the correction of the phase difference may be obtained, and in the estimating, when the phase difference is within the predetermined range, the direction may be estimated based on the corrected phase difference and the distance between the first antenna and the second antenna, and when the phase difference is not within the predetermined range, the direction may be estimated based on the phase difference and the distance between the first antenna and the second antenna.

Thus, in a phase difference range where the relationship between the phase difference and the arrival angle is monotonic and there is no need to reduce disturbances in the phase difference between the received radio waves, a direction in which the target is located can be more accurately estimated using the phase difference that has not yet been corrected. In contrast, in a phase difference range where the relationship between the phase difference and the arrival angle is no longer monotonic due to a disturbance in the phase difference between the received radio waves, a direction in which the target is located can be more accurately estimated using the corrected phase difference.

Furthermore, for example, when a difference between the phase difference and the corrected phase difference at a boundary of the predetermined range is greater than a predetermined value, the calculating of the amount of correction may further include adjusting the corrected phase difference to make the difference between the phase difference and the corrected phase difference less than the predetermined value.

Thus, the gap between the value of the corrected phase difference and the value of the uncorrected phase difference at the boundary between a characteristic curve in which the phase difference that has not yet been corrected is used and a characteristic curve in which the phase difference that has been corrected is used can be set less than the predetermined value. As a result, the arrival angle of the radio waves can be more accurately estimated from the corrected phase difference or the uncorrected phase difference, and thus a direction in which the target is located can be more accurately estimated.

Furthermore, an estimation device according to one aspect of the present disclosure includes: a receiver that receives, by a first antenna and a second antenna different from the first antenna, radio waves including reflected radio waves that are radio waves transmitted from a transmitting antenna and reflected by a target; a phase difference calculator that calculates a phase difference between first received radio waves that are radio waves received by the first antenna of the receiver and second received radio waves that are radio waves received by the second antenna of the receiver; a phase difference corrector that calculates an amount of correction based on an amplitude of the first received radio waves and an amplitude of the second received radio waves, adds, to the phase difference calculated by the phase difference calculator, the amount of correction calculated, and obtains a corrected phase difference resulting from correction of the phase difference; and an estimator that estimates, based on the corrected phase difference and a distance between the first antenna and the second antenna, a direction in which the target is located.

Note that these general or specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

Advantageous Effects

With the estimation method, etc., according to the present disclosure, it is possible to estimate a direction in which a target is located even when there is a disturbance in the received radio waves.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Hereinafter, an embodiment of the present disclosure will be described in detail with reference to the drawings. Note that each embodiment described below shows one specific example of the present disclosure. The numerical values, shapes, materials, structural elements, the arrangement and connection of the structural elements, use procedures, communication procedures, etc., shown in the following embodiment are mere examples, and are not intended to limit the present disclosure. Among the structural elements in the following embodiment, structural elements not recited in any one of the independent claims which indicate the broadest concepts of the present disclosure will be described as arbitrary structural elements. Note that the figures are not necessarily precise illustrations. In the figures, substantially identical elements are assigned the same reference signs, and overlapping description is omitted or simplified.

Embodiment

Hereinafter, an estimation device and an estimation method according to an embodiment will be described with reference to the drawings.

[1 Estimation Device]

Figure 1:
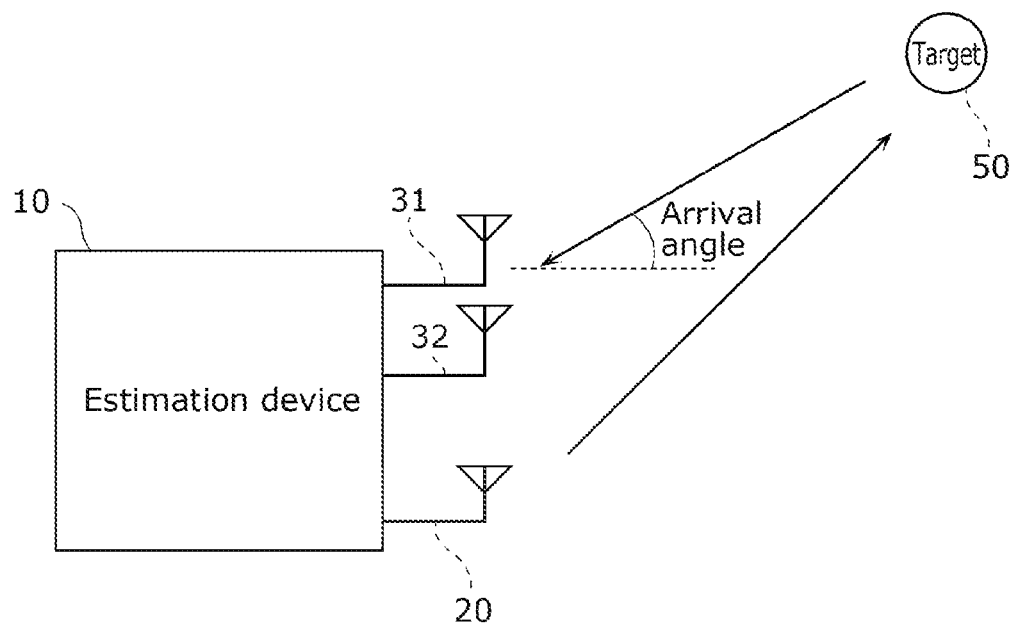
FIG. 1 is a diagram illustrating one example of a typical situation in which an estimation device according to an embodiment is used.

FIG. 1 is a diagram illustrating one example of a typical situation in which estimation device 10 according to an embodiment is used.

Estimation device 10 is, for example, included in a radar and used to estimate a direction in which target 50, which is a target object, is located. Typically, estimation device 10 receives, by first antenna 31 and second antenna 32, radio waves including reflected radio waves that are radio waves transmitted from transmitting antenna 20 and reflected by target 50, as illustrated in FIG. 1. Subsequently, using the phase difference between the radio waves received by first antenna 31 and the radio waves received by second antenna 32, estimation device 10 estimates the arrival angle of the radio waves including reflected radio waves that are radio waves reflected by target 50. Note that in order to simplify description, the present embodiment assumes that target 50 is moving in one direction.

Figure 2:
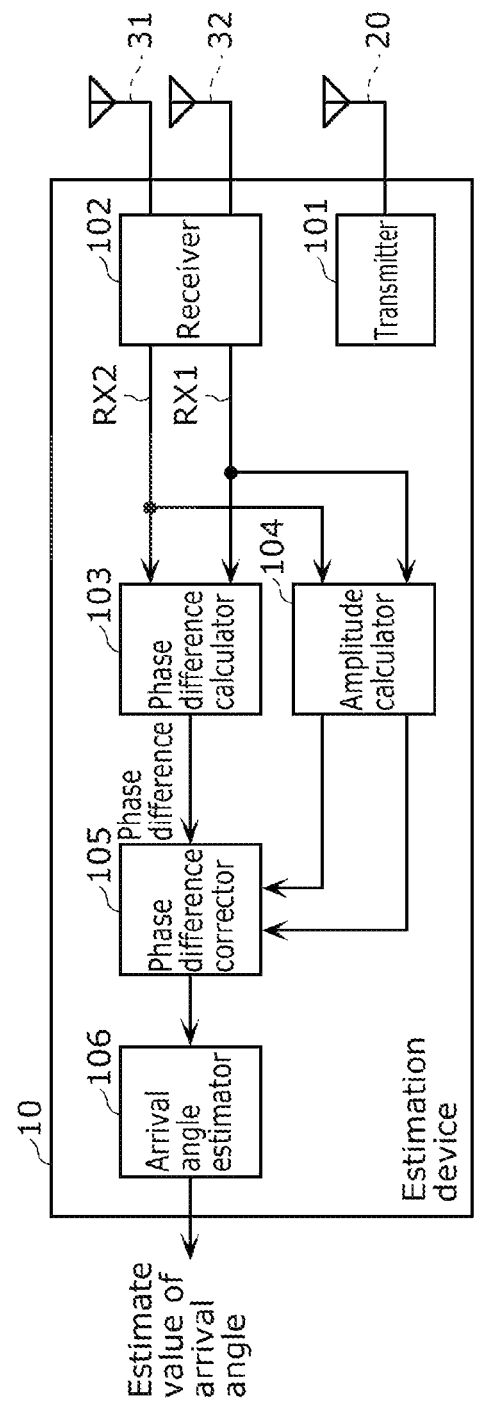
FIG. 2 is a diagram illustrating one example of the functional configuration of an estimation device according to an embodiment.

FIG. 2 is a diagram illustrating one example of the functional configuration of estimation device 10 according to the embodiment.

Estimation device 10 includes transmitting antenna 20, first antenna 31, second antenna 32, transmitter 101, receiver 102, phase difference calculator 103, amplitude calculator 104, phase difference corrector 105, and arrival angle estimator 106, as illustrated in FIG. 2.

Note that FIG. 2 illustrates an example where estimation device 10 includes first antenna 31 and second antenna 32, but this is not limiting. Estimation device 10 may include antennas greater in number than two; for example, when estimation device 10 includes four antennas, it is conceivable that the first antenna and the second antenna operate in pairs and the third antenna and the fourth antenna operate in pairs or, for example, when estimation device 10 includes three antennas, it is conceivable that the first antenna and the second antenna operate in pairs and the second antenna and the third antenna operate in pairs. Furthermore, estimation device 10 need not include transmitter 101 or transmitting antenna 20. When estimation device 10 does not include transmitter 101 or transmitting antenna 20, it is sufficient that transmitter 101 and transmitting antenna 20 be positioned close to estimation device 10.

Hereinafter, before describing the structural elements of estimation device 10, one example of the hardware configuration of estimation device 10 according to the present embodiment except for transmitting antenna 20, first antenna 31, and second antenna 32 will be described first with reference to FIG. 3.

[1.1 Hardware Configuration]

Figure 3:
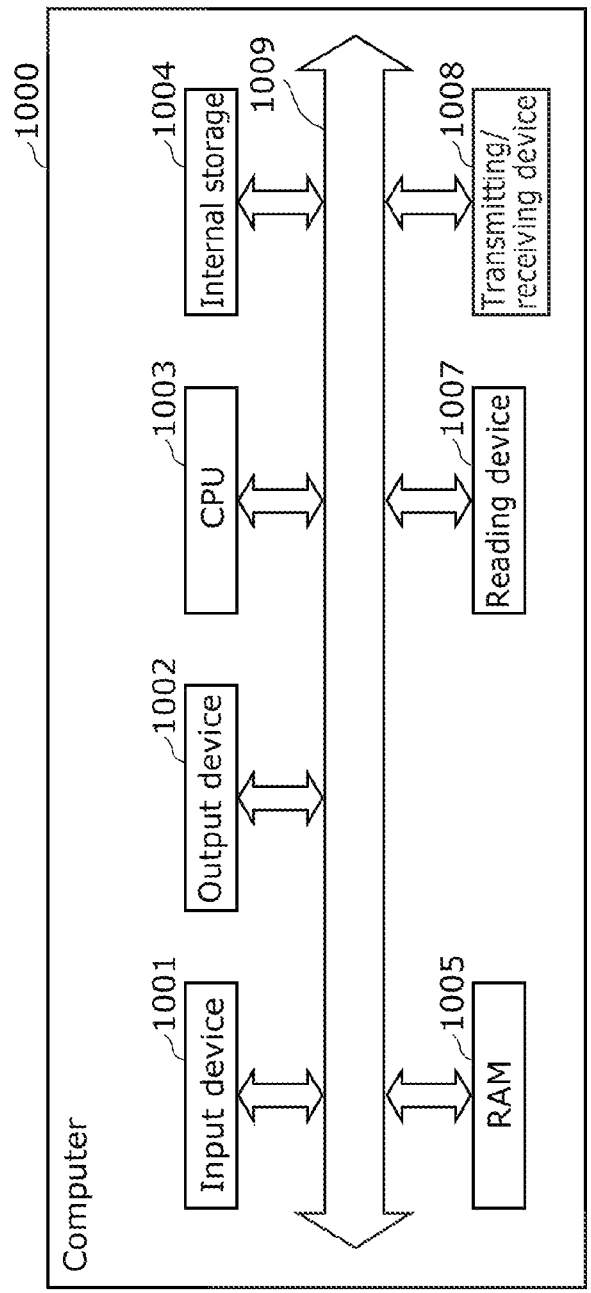
FIG. 3 is a diagram illustrating one example of the hardware configuration of a computer that implements the functions of an estimation device according to an embodiment through software.

FIG. 3 is a diagram illustrating one example of the hardware configuration of computer 1000 that implements the functions of estimation device 10 according to the embodiment through software.

Computer 1000 includes input device 1001, output device 1002, CPU 1003, internal storage 1004, random access memory (RAM) 1005, reading device 1007, transmitting/receiving device 1008, and bus 1009, as illustrated in FIG. 3. Input device 1001, output device 1002, CPU 1003, internal storage 1004, RAM 1005, reading device 1007, and transmitting/receiving device 1008 are connected using bus 1009.

Input device 1001, which serves as a user interface such as an input button, a touch pad, and a touch panel display, receives user input. Note that input device 1001 may be configured to not only receive user touch input, but also receive voice control and a remote operation using a remote control or the like.

Output device 1002, which is also used as input device 1001, includes a touch pad, a touch panel display, or the like and notifies a user of information the user needs to know.

Internal storage 1004 is a flash memory or the like. At least one of a program for implementing the functions of estimation device 10 and an application that uses the functional configuration of estimation device 10 may be stored in internal storage 1004 in advance.

RAM 1005, which is a random-access memory, is used to store data, etc., at the time of execution of the program or the application.

Reading device 1007 reads information from a recording medium such as a universal serial bus (USB) flash drive. Reading device 1007 reads the aforementioned program, application, etc., from a recording medium on which said program, application, etc., are recorded, and stores the read program, application, etc., into internal storage 1004.

Transmitting/receiving device 1008 is a communication circuit for performing wired or wireless communication. For example, transmitting/receiving device 1008 may communicate with a server device or cloud storage connected to a network, download the aforementioned program, application, etc., from the server device or the cloud storage, and store the read program, application, etc., into internal storage 1004.

CPU 1003, which is a central processing unit, copies the program, application, etc., stored in internal storage 1004 onto RAM 1005, sequentially reads commands included in said program, application, etc., from RAM 1005, and executes the read commands.

Next, the functional configurations of estimation device 10 according to the present embodiment will be described.

[1.2 Transmitter 101]

Transmitter 101 generates high-frequency signals that are used to estimate a direction in which target 50, which is a target object, is located. Transmitter 101 includes transmitting antenna 20, as illustrated in FIG. 2. In the present embodiment, transmitter 101 transmits the generated signals (radio waves) from transmitting antenna 20.

[1.3 Receiver 102]

Receiver 102 receives, by each of a plurality of antennas, radio waves including reflected radio waves that are radio waves transmitted from transmitting antenna 20 and reflected by target 50. In the present embodiment, receiver 102 includes first antenna 31 and second antenna 32 different from first antenna 31, as illustrated in FIG. 2. Receiver 102 receives, by first antenna 31 and second antenna 32, radio waves including reflected radio waves that are radio waves transmitted from transmitting antenna 20 and reflected by target 50.

Receiver 102 outputs, to phase difference calculator 103 and amplitude calculator 104, first received radio waves which are radio waves received by first antenna 31 and second received radio waves which are radio waves received by second antenna 32. Note that in FIG. 2, the first received radio waves are denoted as RX1, and the second received radio waves are denoted as RX2.

Note that when receiver 102 includes an even number of antennas that is greater than 2, the same holds true by setting two antennas in each pair to first antenna 31 and second antenna 32.

[1.4 Phase Difference Calculator 103]

Phase difference calculator 103 calculates, from the radio waves received by receiver 102, the phase difference between the radio waves received by two antennas in each pair included in the plurality of antennas. In the present embodiment, phase difference calculator 103 calculates the phase difference between the first received radio waves and the second received radio waves, which are radio waves received by receiver 102.

[1.5 Amplitude Calculator 104]

Amplitude calculator 104 calculates the amplitude of the radio waves received by receiver 102. In the present embodiment, amplitude calculator 104 calculates the amplitude of the first received radio waves, which are radio waves received by receiver 102, and the amplitude of the second received radio waves, which are radio waves received by receiver 102. Note that amplitude calculator 104 may calculate the electric power of the radio waves received by receiver 102 instead of the amplitude of the radio waves received by receiver 102. The electric power includes information of the amplitude and therefore can be handled in substantially the same manner as the amplitude which will be described below.

[1.6 Arrival Angle Estimator 106]

On the basis of the corrected phase difference calculated by phase difference corrector 105 and the distance between first antenna 31 and second antenna 32, arrival angle estimator 106 estimates a direction in which target 50 is located. In the present embodiment, on the basis of the corrected phase difference and the distance between first antenna 31 and second antenna 32, arrival angle estimator 106 estimates the arrival angle of radio waves including reflected radio waves that are radio waves transmitted from transmitting antenna 20 and reflected by target 50. The arrival angle of radio waves is the angle of radio waves arriving at receiver 102 and in the present embodiment, is the angle of radio waves arriving at first antenna 31 and second antenna 32. By estimating the arrival angle of radio waves arriving at receiver 102, arrival angle estimator 106 can estimate a direction in which target 50 is located with respect to estimation device 10 as a reference.

Figure 4A:
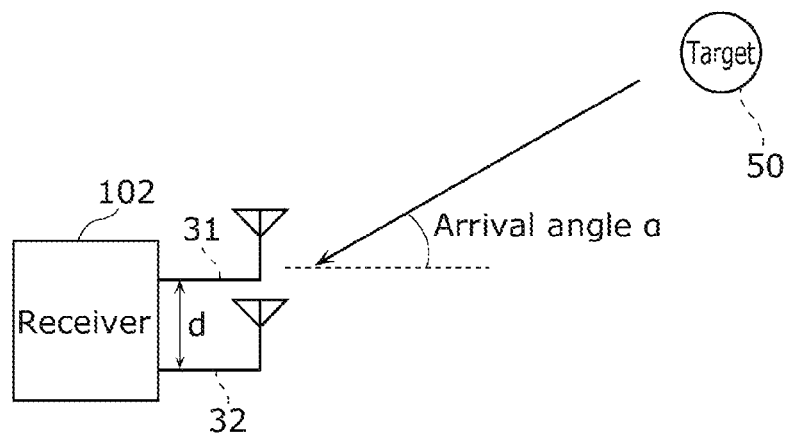
FIG. 4A is a diagram for conceptually describing an arrival angle estimation method according to a comparative example.
Figure 4B:
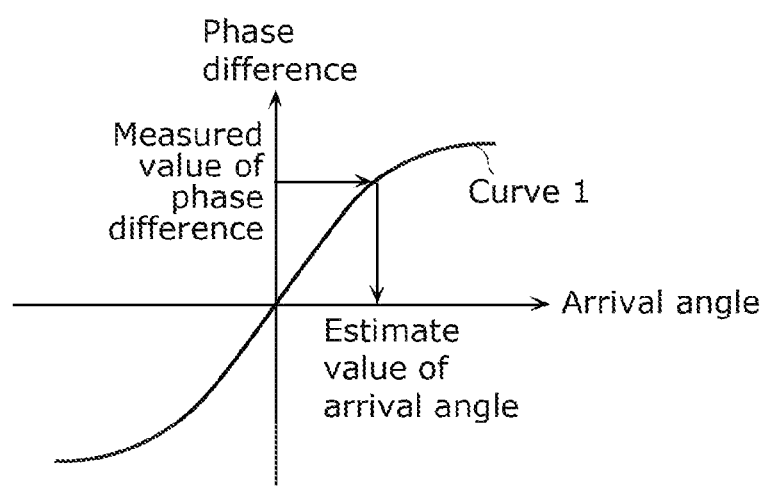
FIG. 4B is a diagram for conceptually describing an arrival angle estimation method according to a comparative example.

FIG. 4A and FIG. 4B are diagrams for conceptually describing an arrival angle estimation method according to a comparative example. FIG. 4A schematically illustrates that radio waves including reflected radio waves that are radio waves reflected by target 50 are arriving at first antenna 31 and second antenna 32 of receiver 102 at arrival angle α. FIG. 4B illustrates curve 1 representing the relationship between the phase difference and the arrival angle.

Regarding arrival angle α indicated in FIG. 4A, phase difference θ of RX1 (the first received radio waves) relative to RX2 (the second received radio waves) can be expressed with the equation denoted as Expression 1 where λ is the wavelength of the radio waves and d is the distance (interval) between first antenna 31 and second antenna 32.

[Math. 1]

$$\theta = \frac{2\pi d}{\lambda} \sin a \qquad \text{Expression 1}$$

Curve 1 indicated in FIG. 4B represents the characteristic curve of the phase difference according to the comparative example and corresponds to a graph made by plotting Expression 1 indicated above. The actual measurement value of the phase difference is the phase difference between RX1 and RX2 obtained as a result of the reception by receiver 102 and is calculated by phase difference calculator 103.

FIG. 4B shows that when the phase difference between RX1 and RX2 obtained as a result of the reception by receiver 102 can be calculated, the arrival angle can be uniquely estimated.

Figure 5A:
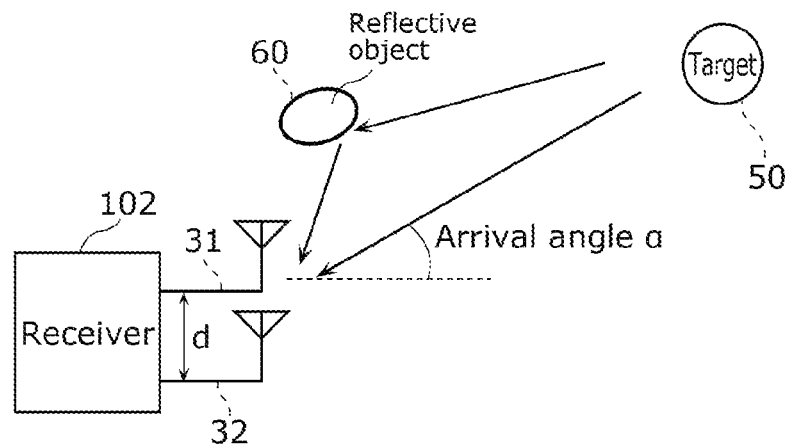
FIG. 5A is a diagram for conceptually describing an arrival angle estimation method according to an embodiment.
Figure 5B:
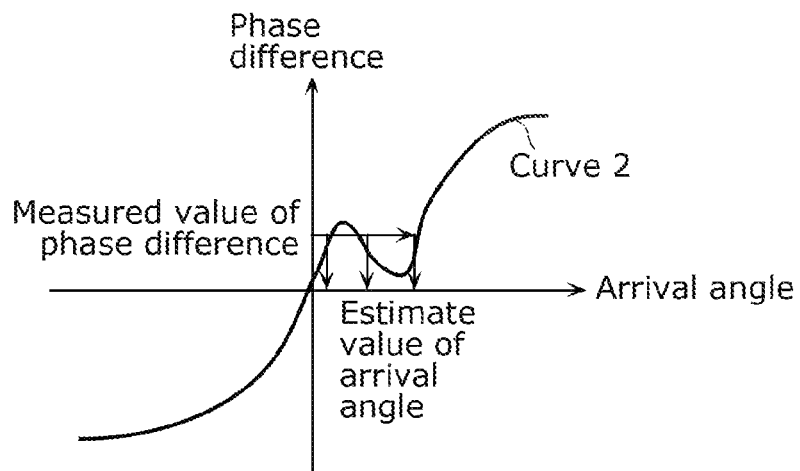
FIG. 5B is a diagram for conceptually describing an arrival angle estimation method according to an embodiment.
Figure 5C:
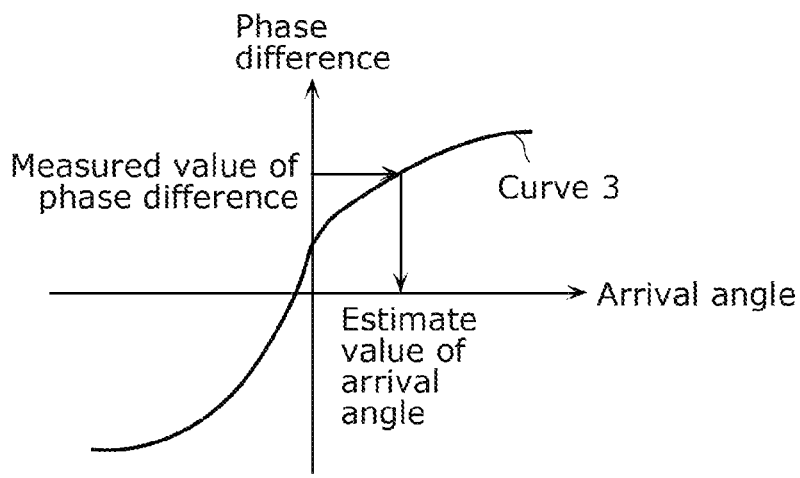
FIG. 5C is a diagram for conceptually describing an arrival angle estimation method according to an embodiment.

FIG. 5A to FIG. 5C are diagrams for conceptually describing an arrival angle estimation method according to the present embodiment.

FIG. 5A schematically illustrates that radio waves including reflected radio waves that are radio waves reflected by target 50 are arriving at first antenna 31 and second antenna 32 of receiver 102 at arrival angle α. In comparison to FIG. 4A, the radio waves including reflected radio waves that are radio waves reflected by target 50 include reflected radio waves that are radio waves reflected by reflective object 60 different from target 50. Therefore, there is a disturbance in the radio waves received by first antenna 31 and second antenna 32 of receiver 102.

Curve 2 indicated in FIG. 5B represents the characteristic curve of the phase difference according to the present embodiment and conceptually shows that there is a disturbance in the phase difference within a predetermined range.

Specifically, when receiver 102 receives radio waves including reflected radio waves that are radio waves reflected by reflective object 60 besides radio waves reflected by target 50, the received radio waves are disturbed radio waves due to inclusion of unnecessary radio waves, leading to loss of the monotonicity of the characteristic curve of the phase difference as seen in curve 2 illustrated in FIG. 5B. Note that with curve 2 illustrated in FIG. 5B, target 50 moving in one direction appears to be reciprocating.

Therefore, when the characteristic curve of the phase difference is no longer monotonic just like curve 2 indicated in FIG. 5B, the arrival angle cannot be uniquely estimated even when the phase difference between RX1 and RX2 obtained as a result of the reception by receiver 102 is calculated, that is, in the case where curve 2 of the calculated phase difference is not monotonic.

Curve 3 indicated in FIG. 5C represents the characteristic curve of the corrected phase difference according to the present embodiment and conceptually shows that monotonicity is obtained as compared to curve 2.

By using the corrected phase difference obtained by phase difference corrector 105 correcting the phase difference calculated by phase difference calculator 103, such as curve 3 indicated in FIG. 5C, it is possible to give monotonicity to (the characteristic curve of the phase difference indicating) the relationship between the corrected phase difference and the arrival angle.

Therefore, when the characteristic curve of the corrected phase difference is monotonic just like curve 3 indicated in FIG. 5C, it is possible to uniquely estimate the arrival angle by calculating the phase difference between RX1 and RX2 obtained as a result of the reception by receiver 102.

[1.7 Phase Difference Corrector 105]

The inventor gained knowledge that the amplitudes of RX1 and RX2 often change in substantially the same cycle as disturbances in the phase difference between RX1 and RX2 and it is possible to reduce the disturbances in the phase difference by addition to the phase difference using the amplitudes and an appropriate coefficient.

Furthermore, the inventor gained knowledge that when the corrected phase difference obtained by correcting the phase difference as mentioned is used, the relationship between the corrected phase difference and the arrival angle is monotonic, and it is possible to uniquely estimate the arrival angle by calculating the phase difference between RX1 and RX2.

Using the amplitudes calculated by amplitude calculator 104, phase difference corrector 105 corrects the phase difference calculated by phase difference calculator 103. In the present embodiment, phase difference corrector 105 calculates the amount of correction based on the amplitude of the first received radio waves and the amplitude of the second received radio waves, adds the calculated amount of correction to the phase difference calculated by phase difference calculator 103, and thus obtains a corrected phase difference resulting from correction of the phase difference calculated by phase difference calculator 103.

For example, phase difference corrector 105 may calculate the amount of correction using a coefficient and the value of the difference between the amplitude of the first received radio waves and the amplitude of the second received radio waves; it is sufficient that the absolute value of the amount of correction decrease as the value of said difference is reduced. More specifically, phase difference corrector 105 may obtain corrected phase difference $\theta_{COMP}$ resulting from correction of phase difference $\theta$ calculated by phase difference calculator 103, as indicated in Expression 2. In Expression 2, c is a coefficient, a2 is the amplitude of the second received radio waves, and a1 is the amplitude of the first received radio waves.

[Math. 2]

$$\theta_{COMP} = \theta + c(a_2 - a_1)$$  Expression 2

Furthermore, for example, phase difference corrector 105 may calculate the amount of correction using the coefficient and the value of the ratio between the amplitude of the first received radio waves and the amplitude of the second received radio waves. This is because, since the amplitude of the first received radio waves and the amplitude of the second received radio waves depend on the size of target 50 and the distance from target 50, impacts thereof can be removed using the ratio between the amplitude of the first received radio waves and the amplitude of the second received radio waves. It is sufficient that the absolute value of the amount of correction decrease as the value of said ratio approaches predetermined value k. More specifically, phase difference corrector 105 may obtain corrected phase difference $\theta_{COMP}$ resulting from correction of phase difference $\theta$ calculated by phase difference calculator 103, as indicated in Expression 3. In Expression 3, c is a coefficient, a2 is the amplitude of the second received radio waves, and a1 is the amplitude of the first received radio waves. Furthermore, k may be set to an appropriate value according to actual measurement, the result of a simulation, etc.

[Math. 3]

$$\theta_{COMP} = \theta + c\left(\frac{a_2}{a_1} - k\right)$$  Expression 3

Furthermore, for example, phase difference corrector 105 may calculate the amount of correction using the coefficient and the value of the ratio between the sum of the amplitude of the first received radio waves and the amplitude of the second received radio waves and the difference between the amplitude of the first received radio waves and the amplitude of the second received radio waves. This is because, since the amplitude of the first received radio waves and the amplitude of the second received radio waves depend on the size of target 50 and the distance from target 50, impacts thereof can be removed using the ratio between the sum of the amplitude of the first received radio waves and the amplitude of the second received radio waves and the difference between the amplitude of the first received radio waves and the amplitude of the second received radio waves. It is sufficient that the absolute value of the amount of correction decrease as the ratio of the difference to the sum approaches predetermined value m. More specifically, phase difference corrector 105 may obtain corrected phase difference $\theta_{COMP}$ resulting from correction of phase difference $\theta$ calculated by phase difference calculator 103, as indicated in Expression 4. In Expression 4, c is a coefficient, a2 is the amplitude of the second received radio waves, and a1 is the amplitude of the first received radio waves. Furthermore, m may be set to an appropriate value according to actual measurement, the result of a simulation, etc. Note that dividing the denominator and the numerator in the bracket by a1 reveals dependency on the ratio between the amplitude of the first received radio waves and the amplitude of the second received radio waves, which is similar to Expression 3.

[Math. 4]

$$\theta_{COMP} = \theta + c\left(\frac{a_2 - a_1}{a_2 + a_1} - m\right)$$  Expression 4

Note that phase difference corrector 105 may correct the phase difference calculated by phase difference calculator 103 by the amount of correction calculated according to a high-order expression using two or more coefficients (c1, c2, . . . ). This is because the amount of correction calculated according to the high-order expression allows expression of a more flexible form and thus disturbances in the phase difference calculated by phase difference calculator 103 can be further reduced.

Specifically, phase difference corrector 105 may obtain corrected phase difference $\theta_{COMP}$ resulting from correction of phase difference $\theta$ calculated by phase difference calculator 103, as indicated in Expression 5, Expression 6, or Expression 7 below, for example.

[Math. 5]

$$\theta_{COMP} = \theta + c_1(a_2 - a_1) + c_2(a_2 - a_1)^2 + \ldots \quad \text{Expression 5}$$

[Math. 6]

$$\theta_{COMP} = \theta + c_1\left(\frac{a_2}{a_1} - k\right) + c_2\left(\frac{a_2}{a_1} - k\right)^2 + \ldots \quad \text{Expression 6}$$

[Math. 7]

$$\theta_{COMP} = \theta + c_1\left(\frac{a_2 - a_1}{a_2 + a_1} - m\right) + c_2\left(\frac{a_2 - a_1}{a_2 + a_1} - m\right)^2 + \ldots \quad \text{Expression 7}$$

Specifically, phase difference corrector 105 may calculate the amount of correction using two or more coefficients and two or more terms having the highest order of at least 2 and including the difference between the amplitude of the first received radio waves and the amplitude of the second received radio waves, as indicated in Expression 5, for example.

Furthermore, phase difference corrector 105 may calculate the amount of correction using two or more coefficients and two or more terms having the highest order of at least 2 and including the ratio between the amplitude of the first received radio waves and the amplitude of the second received radio waves, as indicated in Expression 6, for example.

Furthermore, phase difference corrector 105 may calculate the amount of correction using two or more coefficients and two or more terms having the highest order of at least 2 and including the ratio between the sum of the amplitude of the first received radio waves and the amplitude of the second received radio waves and the difference between the amplitude of the first received radio waves and the amplitude of the second received radio waves, as indicated in Expression 7, for example.

[2 Operation of Estimation Device 10]

Next, the operation of estimation device 10 according to the present embodiment will be described.

Figure 6:
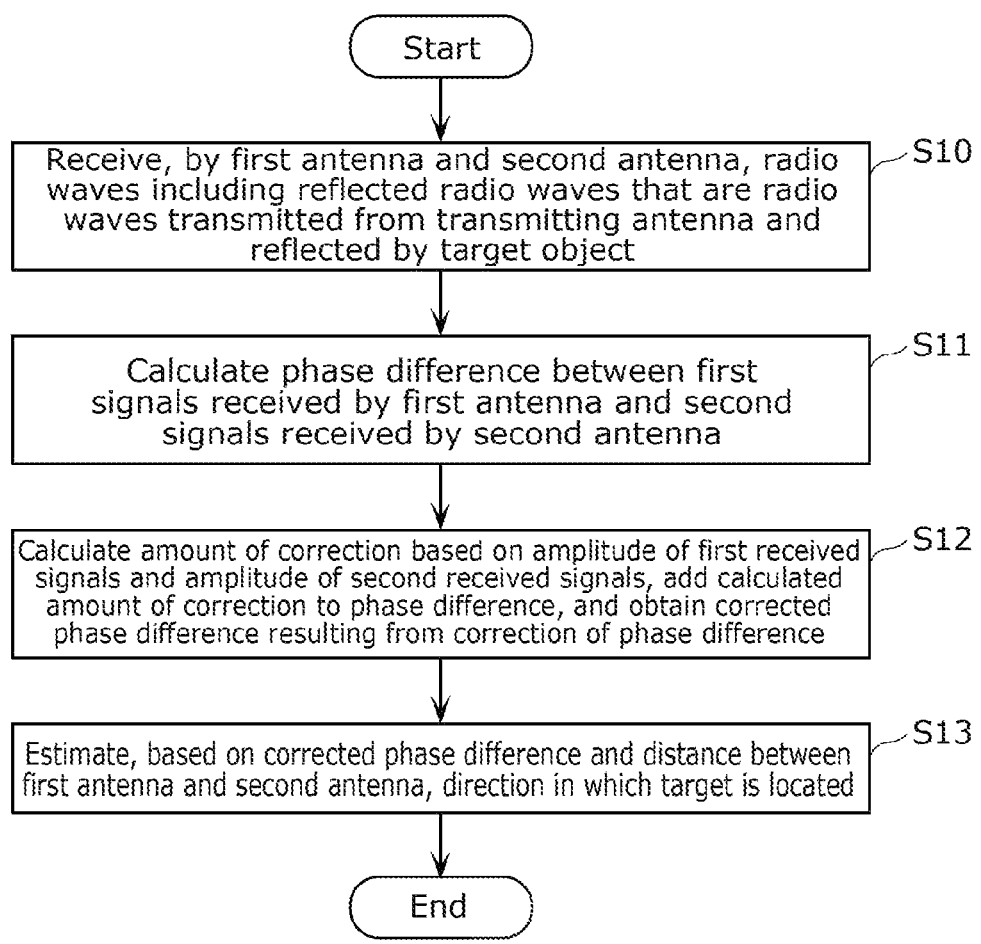
FIG. 6 is a flowchart illustrating the operation of an estimation device according to an embodiment.

FIG. 6 is a flowchart illustrating the operation of estimation device 10 according to the embodiment.

First, estimation device 10 receives, by first antenna 31 and second antenna 32, radio waves including reflected radio waves that are radio waves transmitted from transmitting antenna 20 and reflected by target 50 (S10).

Next, estimation device 10 calculates the phase difference between the first received radio waves which are radio waves received by first antenna 31 in Step S10 and the second received radio waves which are radio waves received by second antenna 32 in Step S10 (S11).

Next, estimation device 10 calculates the amount of correction based on the amplitude of the first received radio waves and the amplitude of the second received radio waves, adds the calculated amount of correction to the phase difference calculated in Step S11, and thus obtains a corrected phase difference resulting from correction of said phase difference (S12).

Next, on the basis of the corrected phase difference obtained in Step S12 and the distance between the first antenna and the second antenna, estimation device 10 estimates a direction in which target 50 is located (S13).

[3 Advantageous Effects, etc.]

As described above, the arrival angle of radio waves from target 50 can be calculated from the phase difference between radio waves received by the plurality of antennas and including reflected radio waves that are radio waves transmitted from transmitting antenna 20 and reflected by target 50. However, when the aforementioned phase difference is disturbed due to the received radio waves including reflected radio waves that are radio waves reflected by unintended reflective object 60, the arrival angle of radio waves from target 50 cannot be calculated.

To deal with this, the inventor gained knowledge that the cycle of disturbances in the phase difference between the received radio waves is in synchronization with the cycle of the amplitude of the received radio waves. Furthermore, the inventor gained knowledge that the characteristic curve of the phase difference does not return to as neat a curve as that obtained when there is no disturbance in the phase difference, but the characteristic curve of the corrected phase difference obtained by adding, to the expression of the phase difference, a correcting term for reducing disturbances in the phase difference using the amplitudes can be made monotonic.

Thus, in estimation device 10 and the estimation method according to the present embodiment, the first antenna and the second antenna receive radio waves including reflected radio waves that are radio waves transmitted from the transmitting antenna and reflected by the target, and the phase difference between the first received radio waves which are radio waves received by the first antenna and the second received radio waves which are radio waves received by the second antenna is calculated. Furthermore, the amount of correction based on the amplitude of the first received radio waves and the amplitude of the second received radio waves is calculated and added to the calculated phase difference, thus a corrected phase difference resulting from correction of the phase difference is obtained, and thus a direction in which the target is located is estimated on the basis of the corrected phase difference and the distance between the first antenna and the second antenna.

In this manner, with estimation device 10 and the estimation method according to the present embodiment, it is possible to reduce disturbances in the phase difference between the received radio waves by correcting the phase difference of the received radio waves by the amount of correction based on the amplitudes of the received radio waves, and thus it is possible to estimate the arrival angle of the received radio waves from the corrected phase difference even when there is a disturbance in the received radio waves. Thus, with estimation device 10 and the estimation method according to the present embodiment, it is possible to estimate a direction in which target 50 is located.

The phase difference between the received radio waves may be corrected by the amount of correction based on the value of the ratio between the amplitudes of the received radio waves, the phase difference between the received radio waves may be corrected by the amount of correction based on the difference between the amplitudes of the received radio waves, or the phase difference between the received radio waves may be corrected by the amount of correction based on the value of the ratio between the sum of the amplitudes of the received radio waves and the difference between the amplitudes of the received radio waves. No matter which correction is applied, disturbances in the phase difference between the received radio waves can be reduced.

Note that the amount of correction may be the amount of correction calculated according to a high-order expression that uses the ratio between the amplitudes of the received radio waves, may be the amount of correction calculated according to a high-order expression that uses the difference between the amplitudes of the received radio waves, or may be the amount of correction calculated according to a high-order expression that uses the value of the ratio between the sum of the amplitudes of the received radio waves and the difference between the amplitudes of the received radio waves. Using one of these amounts of correction, disturbances in the phase difference between the received radio waves can be reduced.

Variation

The above embodiment indicates that when the phase difference is corrected by adding, to the expression of the phase difference, a correcting term for reducing disturbances in the phase difference using the amplitudes of the received radio waves, the relationship between the corrected phase difference and the arrival angle (that is, the characteristic curve of the corrected phase difference) can be made monotonic.

However, although the characteristic curve of the corrected phase difference can be made monotonic, there are cases where the monotonicity is partially degraded as compared to the relationship between the arrival angle and the phase difference that has not yet been corrected (that is, the characteristic curve of the uncorrected phase difference).

Thus, the present variation describes the case of using, for only a portion in which the monotonicity is not degraded as compared to the characteristic curve of the uncorrected phase difference, the characteristic curve of the corrected phase difference obtained by adding, to the expression of the phase difference, a correcting term for reducing disturbances in the phase difference using the amplitudes of the received radio waves.

Figure 7A:
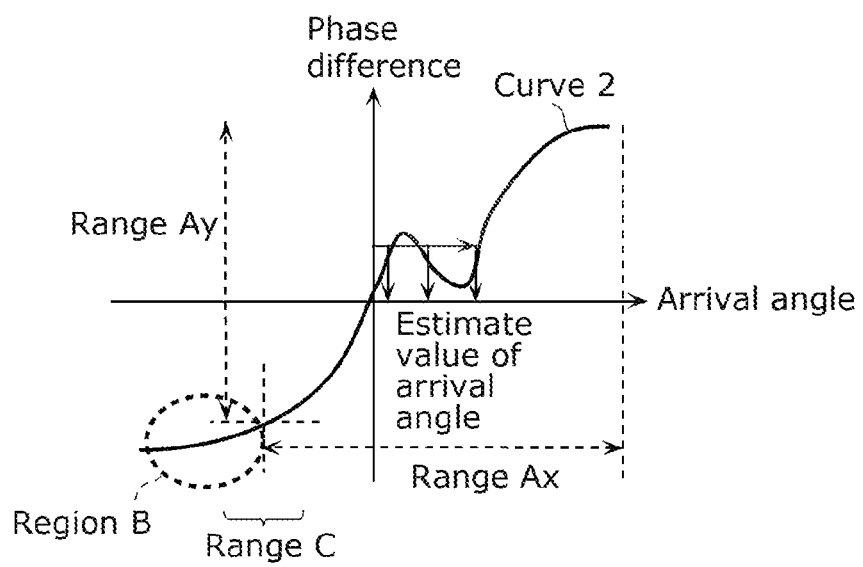
FIG. 7A is a diagram for conceptually describing that the monotonicity of a characteristic curve of a corrected phase difference according to a variation is partially degraded.
Figure 7B:
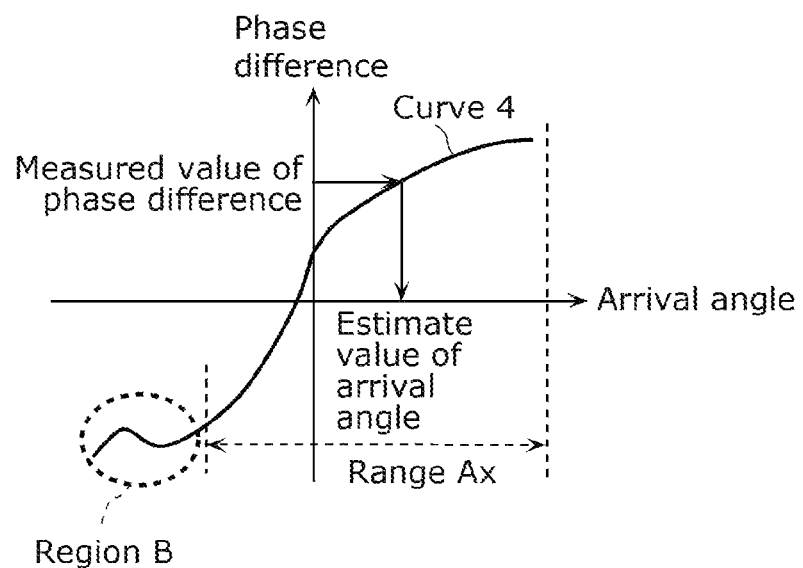
FIG. 7B is a diagram for conceptually describing that the monotonicity of a characteristic curve of a corrected phase difference according to a variation is partially degraded.

FIG. 7A and FIG. 7B are diagrams for conceptually describing that the monotonicity of the characteristic curve of the corrected phase difference according to the present variation is partially degraded. FIG. 7A is a diagram illustrating the characteristic curve of the uncorrected phase difference in which there is a disturbance in the phase difference within a predetermined range. Note that curve 2 indicated in FIG. 7A is the same as curve 2 indicated in FIG. 5B. Curve 4 indicated in FIG. 7B is the characteristic curve of the corrected phase difference resulting from correction of the phase difference by a correcting term for reducing disturbances in the phase difference using the amplitudes of the received radio waves; FIG. 7B shows that the monotonicity of curve 4 is partially degraded.

Comparison between FIG. 7A and FIG. 7B shows that curve 4 in FIG. 7B is monotonic as a result of a reduction in disturbances in the phase difference which are indicated by curve 2 in FIG. 7A, but the monotonicity of curve 4 in FIG. 7B is degraded in region B as compared to curve 2 in FIG. 7A. Therefore, this shows that it is possible to reduce the degradation of the monotonicity by applying curve 4 only to range Ax of the arrival angle other than region B and applying curve 2 to the area other than range Ax.

Thus, in the present variation, the phase difference is corrected in only range Ay of the phase difference that has not yet been corrected that corresponds to range Ax of the arrival angle indicated in FIG. 7A. This makes the phase difference more monotonic over the entire range.

More specifically, when the phase difference calculated by phase difference calculator 103 is within a predetermined range including a range where the relationship between the phase difference and the arrival angle is no longer monotonic, phase difference corrector 105 according to the present variation may obtain the corrected phase difference resulting from correction of said phase difference.

Furthermore, when the phase difference calculated by phase difference calculator 103 is within said predetermined range, it is sufficient that on the basis of the corrected phase difference obtained by phase difference corrector 105 and the distance between the first antenna and the second antenna, arrival angle estimator 106 according to the present variation estimate a direction in which target 50 is located. On the other hand, when the phase difference calculated by phase difference calculator 103 is not within said predetermined range, it is sufficient that on the basis of the phase difference calculated by phase difference calculator 103 and the distance between first antenna 31 and second antenna 32, arrival angle estimator 106 according to the present variation estimate a direction in which target 50 is located.

Thus, in a phase difference range where the relationship between the phase difference and the arrival angle (the characteristic curve of the uncorrected phase difference) is monotonic and there is no need to reduce disturbances in the phase difference between the received radio waves, a direction in which the target is located can be more accurately estimated using the phase difference that has not yet been corrected. In contrast, in a phase difference range where the relationship between the phase difference and the arrival angle (the characteristic curve of the uncorrected phase difference) is no longer monotonic due to a disturbance in the phase difference between the received radio waves, a direction in which the target is located can be more accurately estimated using the corrected phase difference.

Note that when the phase difference is corrected in only range Ay of the phase difference that has not yet been corrected which corresponds to range Ax of the arrival angle indicated in FIG. 7A, a gap (a step or a displacement) is sometimes formed between the value of the phase difference that has not yet been corrected and the value of the phase difference that has been corrected at a boundary portion of range Ay of the phase difference that has not yet been corrected that is located in C. In such a case, it is sufficient that offset of at least one of the phase difference that has not yet been corrected and the phase difference that has been corrected be adjusted or the slope be adjusted to make the gap less than or equal to an allowable value.

Figure 8A:
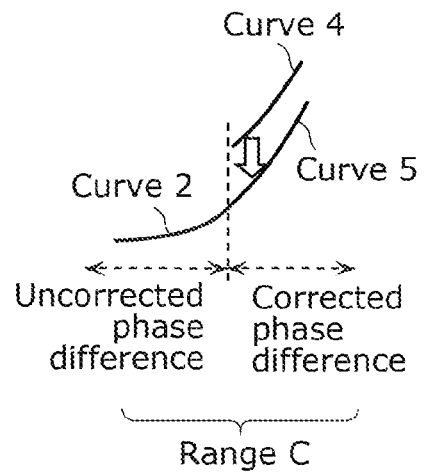
FIG. 8A is a diagram for conceptually describing that the gap formed between the value of a phase difference that has not yet been corrected and the value of a phase difference that has been corrected at a boundary portion according to a variation can be adjusted through offsetting.
Figure 8B:
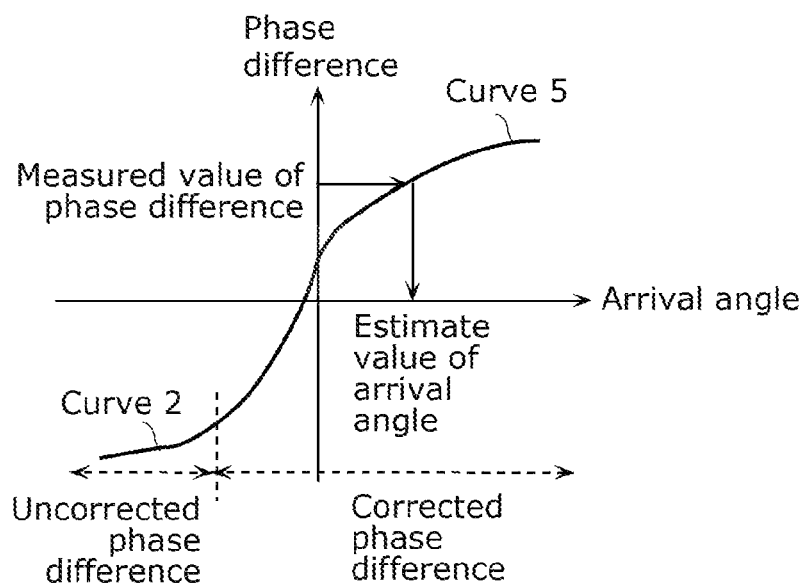
FIG. 8B is a diagram for conceptually describing that the gap formed between the value of a phase difference that has not yet been corrected and the value of a phase difference that has been corrected at a boundary portion according to a variation can be adjusted through offsetting.

FIG. 8A and FIG. 8B are diagrams for conceptually describing that the gap formed between the value of the phase difference that has not yet been corrected and the value of the phase difference that has been corrected at a boundary portion according to the present variation can be adjusted through offsetting.

FIG. 8A shows that there is a gap (a step or a displacement) between curve 4 indicated in FIG. 7B and curve 2 indicated in FIG. 7A at a boundary portion located in range C indicated in FIG. 7A. FIG. 8A shows an example where the gap formed between curve 4 indicated in FIG. 7B and curve 2 indicated in FIG. 7A has been removed by adjusting, as curve 5, the offset of curve 4 indicated in FIG. 7B, that is, the phase difference that has been corrected. FIG. 8B shows that there is no gap at the boundary portion between that curve 2 representing the characteristic curve of the uncorrected phase difference and curve 5 representing the characteristic curve of the corrected phase difference, the offset of which has already been adjusted.

In this manner, by adjusting the offset of the phase difference that has been corrected, the gap formed between the value of the phase difference that has not yet been corrected and the value of the phase difference that has been corrected at a boundary portion located in range C can be set less than or equal to an allowable value such as zero (the predetermined value).

More specifically, when the difference between the phase difference and the corrected phase difference is greater than a predetermined value at a boundary in a predetermined range, phase difference corrector 105 according to the present variation may further adjust the corrected phase difference to make the difference between the phase difference and the corrected phase difference less than the predetermined value.

Thus, the gap between the value of the corrected phase difference and the value of the uncorrected phase difference at the boundary between a characteristic curve in which the phase difference that has not yet been corrected is used and a characteristic curve in which the phase difference that has been corrected is used can be set less than the predetermined value. As a result, the arrival angle of the radio waves can be more accurately estimated from the corrected phase difference or the uncorrected phase difference, and thus a direction in which the target is located can be more accurately estimated.

The estimation method and the estimation device according to an aspect of the present disclosure have been described thus far based on the embodiment, etc., but the present disclosure is not limited to this embodiment. For example, other embodiments that can be realized by arbitrarily combining structural elements described in the present specification or by removing some structural elements may be embodiments of the present disclosure. Furthermore, variations obtainable through various changes to the above-described embodiment that can be conceived by a person having ordinary skill in the art without departing from the essence of the present disclosure, that is, the meaning of the recitations in the claims are included in the present disclosure.

Furthermore, the embodiments described below may also be included in one or more aspects of the present disclosure.

(1) Some of the structural elements included in the above-described estimation device may be a computer system configured of a microprocessor, a read only memory (ROM), a random access memory (RAM), a hard disk unit, a display unit, a keyboard, and a mouse, for example. A computer program is stored in the RAM or the hard disk unit. The microprocessor achieves its function by way of the microprocessor operating according to the computer program. Here, the computer program is configured of a combination of command codes indicating instructions to the computer in order to achieve a predetermined function.

(2) Some of the structural elements included in the above-described estimation device may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function by way of the microprocessor operating according to the computer program.

(3) Some of the structural elements included in the above-described estimation device may be configured from a standalone module or an IC card that can be inserted into and removed from the device. The IC card or the module is a computer system made up of a microprocessor, ROM, RAM, and so on. The IC card or the module may include the aforementioned super multifunctional LSI. The IC card or the module achieves its functions by way of the microprocessor operating according to the computer program. The IC card and the module may be tamperproof.

(4) Furthermore, some of the structural elements included in the above-described estimation device may be the aforementioned computer program or a digital signal recorded on a computer-readable recording medium, such as a flexible disk, a hard disk, a compact disc read-only memory (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be the digital signal recorded on these recoding media.

Furthermore, in some of the structural elements included in the above-described estimation device, the computer program or the digital signal may be transmitted via an electrical communication line, a wireless or wired communication line, a network represented by the Internet, data broadcasting, or the like.

(5) The present disclosure may be the above-described methods. Furthermore, the present disclosure may be a computer program for implementing these methods using a computer or may be a digital signal of the computer program.

(6) Furthermore, the present disclosure may be a computer system including a microprocessor and a memory. The memory may have the computer program stored therein, and the microprocessor may operate according to the computer program.

(7) Moreover, by transferring the recording medium having the program or the digital signal recorded thereon or by transferring the program or the digital signal via the network or the like, the present disclosure may be implemented by a different independent computer system.

(8) The above embodiment and the above variations may be combined with each other.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure can be used for estimation methods and estimation devices and used particularly for an estimation method and an estimation device for use in radars, etc., for estimating a direction in which a target object is located.

The invention claimed is:
1. An estimation method comprising:
receiving, by a first antenna and a second antenna different from the first antenna, radio waves including reflected radio waves that are radio waves transmitted from a transmitting antenna and reflected by a target;

calculating a phase difference between first received radio waves that are radio waves received by the first antenna in the receiving and second received radio waves that are radio waves received by the second antenna in the receiving;

calculating an amount of correction based on an amplitude of the first received radio waves and an amplitude of the second received radio waves, adding, to the phase difference calculated in the calculating of the phase difference, the amount of correction calculated, and obtaining a corrected phase difference resulting from correction of the phase difference; and estimating, based on the corrected phase difference and a distance between the first antenna and the second antenna, a direction in which the target is located.

2. The estimation method according to claim 1, wherein in the calculating of the amount of correction, the amount of correction is calculated using a coefficient and a value of a ratio between the amplitude of the first received radio waves and the amplitude of the second received radio waves.

3. The estimation method according to claim 2, wherein an absolute value of the amount of correction decreases as the value of the ratio approaches predetermined value k, and the predetermined value k is determined from one of a result of an experiment or a result of a simulation.

4. The estimation method according to claim 3, wherein in the calculating of the amount of correction, the amount of correction is calculated using two or more coefficients and two or more terms having a highest order of at least 2 and including the ratio.

5. The estimation method according to claim 1, wherein in the calculating of the amount of correction, the amount of correction is calculated using a coefficient and a value of a difference between the amplitude of the first received radio waves and the amplitude of the second received radio waves, and an absolute value of the amount of correction is reduced as an absolute value of the difference is reduced.

6. The estimation method according to claim 5, wherein in the calculating of the amount of correction, the amount of correction is calculated using two or more coefficients and two or more terms having a highest order of at least 2 and including the difference.

7. The estimation method according to claim 1, wherein in the calculating of the amount of correction, the amount of correction is calculated using a coefficient and a value of a ratio between a sum of the amplitude of the first received radio waves and the amplitude of the second received radio waves and a difference between the amplitude of the first received radio waves and the amplitude of the second received radio waves.

8. The estimation method according to claim 7, wherein an absolute value of the amount of correction decreases as the ratio of the difference to the sum approaches predetermined value m.

9. The estimation method according to claim 7, wherein in the calculating of the amount of correction, the amount of correction is calculated using two or more coefficients and two or more terms having a highest order of at least 2 and including the ratio between the sum and the difference.

10. The estimation method according to claim 1, wherein when the phase difference calculated in the calculating of the phase difference is within a predetermined range including a range where a relationship between the phase difference and an arrival angle is no longer monotonic, the corrected phase difference resulting from the correction of the phase difference is obtained, and in the estimating, when the phase difference is within the predetermined range, the direction is estimated based on the corrected phase difference and the distance between the first antenna and the second antenna, and when the phase difference is not within the predetermined range, the direction is estimated based on the phase difference and the distance between the first antenna and the second antenna.

11. The estimation method according to claim 10, wherein when a difference between the phase difference and the corrected phase difference at a boundary of the predetermined range is greater than a predetermined value, the calculating of the amount of correction further includes adjusting the corrected phase difference to make the difference between the phase difference and the corrected phase difference less than the predetermined value.

12. An estimation device comprising:

a receiver that receives, by a first antenna and a second antenna different from the first antenna, radio waves including reflected radio waves that are radio waves transmitted from a transmitting antenna and reflected by a target;

a phase difference calculator that calculates a phase difference between first received radio waves that are radio waves received by the first antenna of the receiver and second received radio waves that are radio waves received by the second antenna of the receiver;

a phase difference corrector that calculates an amount of correction based on an amplitude of the first received radio waves and an amplitude of the second received radio waves, adds, to the phase difference calculated by the phase difference calculator, the amount of correction calculated, and obtains a corrected phase difference resulting from correction of the phase difference; and an estimator that estimates, based on the corrected phase difference and a distance between the first antenna and the second antenna, a direction in which the target is located.

* * * * *